April 17, 1962 R. E. ROGERS 3,030,056
VIBRATION MOUNT FOR COMPRESSORS AND THE LIKE
Filed Sept. 2, 1959
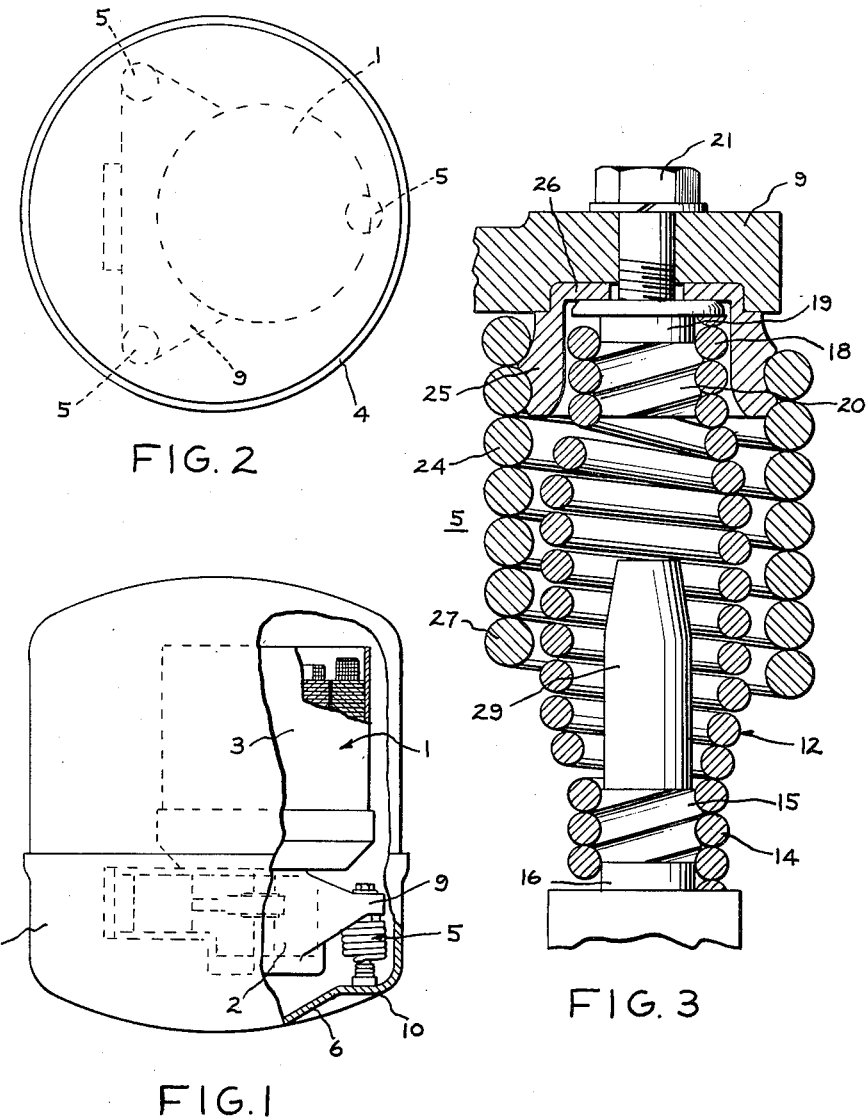
INVENTOR
ROBERT E. ROGERS
BY
HIS ATTORNEY United States Patent Office 3,030,056
Patented Apr. 17, 1962

3,030,056
VIBRATION MOUNT FOR COMPRESSORS
AND THE LIKE
Robert E. Rogers, Tyler, Tex., assignor to General Electric Company, a corporation of New York
Filed Sept. 2, 1959, Ser. No. 837,645
3 Claims. (Cl. 248—20)

The present invention relates to a vibration mount and is more particularly concerned with an improved spring support for a load such as a vertically disposed motor-compressor unit having horizontal forces which produce horizontal vibrations that are imposed on the mount.

Hermetically sealed compressor units, such as those used in the refrigeration industry, comprise a motor-compressor unit supported within a hermetically sealed casing. In order to protect the unit against damage during handling or operation thereof and to absorb the normal operating vibrations of the unit, the unit is generally resiliently supported within the casing in spaced relationship with the casing walls. One type of resilient support means frequently used comprises a load supporting compression spring disposed between the compressor and the bottom wall of the casing. In order to limit relative horizontal motion between the unit and the casing, it has been common practice to provide this type of compression spring support with rigid stop means in the form of a solid cup surrounding an exterior portion of the spring and a pin extending upwardly through the spring or both cup and pin, either of which upon contact with the spring or with one another through the spring limits horizontal movement or tilting of the spring to thereby limit horizontal vibrations of the compressor unit.

While these rigid vibration-limiting means have been found to be generally satisfactory for protecting the unit and the spring mount against extreme handling and shipping shocks, they have not been found to be completely satisfactory for limiting the horizontal vibrations occurring during the normal operation of the compressor unit as for example the rotational oscillations occurring during the starting and stopping of a vertically disposed motor compressor unit. In such case the "banging" noise caused by contacting of the rigid stop means is objectionable while the repeated impact loads on a rigid stop means has resulted in premature failure of these means or components of the compressor unit.

Accordingly, it is a primary object of the present invention to provide a simple, low cost and relatively quiet vibration mount particularly designed for absorbing and cushioning horizontal vibrations.

Another object of the invention is to provide a vibration mount comprising a load supporting compression spring and means associated with the spring for quietly and effectively snubbing horizontal vibrational forces to which the mount may be subjected.

A further object of the invention is to provide an improved vibration mount including a load supporting compression coil spring and means for resiliently limiting or absorbing horizontal vibrations of a load supported on the mount.

Further objects and advantages of the present invention will become apparent as the following description proceeds and the features of novelty which characterize the invention will be pointed out with particularity in the claims annexed to and forming a part of this specification.

In accordance with the present invention, there is provided a vibration mount for resiliently supporting a load such as a vertically disposed motor compressor unit on a base such as the bottom wall of a hermetic casing enclosing that unit. The mount comprises a vertically-disposed load-supporting compression spring having its opposite ends secured respectively to a load engaging member and a base member. The compression spring is designed to support its intended load and to also absorb or cushion normal vertical vibrations of the load relative to the base. For cushioning lateral or horizontal vibrations of the load such as those occurring during the starting and stopping of a motor compressor unit, there is provided a snubber spring concentrically positioned relative to the load supporting compression spring and secured at one end to either the load engaging or the base member. The free or unsupported end of the snubber spring is positioned in spaced relation with an intermediate portion of the load supporting spring where it is contacted by that spring upon relative horizontal movement of the load with reference to the base to snub or damp the horizontal motion of the load. In a preferred form of the invention, the snubber spring is close coiled so that a frictional damping action is also obtained as the adjacent coils of the snubber spring slide over each other.

For a better understanding of the invention reference may be had to the accompanying drawing in which:

FIG. 1 is an elevational view, partly in section, showing a hermetic compressor embodying the vibration mount of the present invention;

FIG. 2 is a plan view of the compressor of FIG. 1; and

FIG. 3 is a detailed sectional view of the vibration mount of the present invention.

Referring to the drawing and more particularly to FIGS. 1 and 2 thereof, there is shown a motor-compressor unit 1 including a compressor 2 and a motor 3 for driving the compressor, the unit being vertically mounted within a sealed casing 4. As the detailed construction of the motor-compressor unit forms no particular part of the present invention, its specific instruction features are neither shown nor described in detail.

The motor-compressor unit 1 is resiliently supported within the casing 4 by means of a plurality of vibration mounts 5 which serve to support the load of the compressor on the base or bottom wall 6 of the casing. In the illustrated embodiment of the invention, three such spring mounts are employed and as shown in FIG. 2 of the drawing they are spaced from one another and from the axis of the motor-compressor unit. Each of these vibration mounts is designed so that it resiliently supports the compressor on the base or bottom wall of the casing and cushions or absorbs vertical vibrations of the load, that is the compressor, relative to the base or bottom wall 6. The motor-compressor unit is provided with a plurality of brackets or flanges 9 to which are secured the upper ends of the vibration mounts 5 while the bottom wall 6 of the casing includes a plurality of horizontally extending surface areas 10 or equivalent flat areas to which the lower ends of the vibration mount are fastened.

With reference now to FIG. 3 of the drawing, each vibration mount comprises a vertically disposed load supporting compression spring 12, the lowermost coils 14 of which are threadably received in a spiral groove 15 provided on the stud or base member 16 which in turn is suitably secured as by welding or brazing to one of the flattened portions 10 of the casing 6. The spiral groove 15 serves to lock the lowermost coils 14 onto the stud 16 and prevent vertical movement of this portion of the spring relative to the stud. The upper coils 18 of the spring 12 are similarly secured to a stud 19 having on the surface thereof a plurality of spiral grooves 20 for threadably receiving the coils 18. This stud 19 functioning as a load engaging member is secured to the flange 9 by means of a bolt 21.

In order to isolate the compressor from the case under normal running conditions, it is desirable to employ a load supporting spring which is soft or in other words has a low spring rate in the horizontal direction. Such a spring then allows larger deflections during starting and stopping of the compressor when the compressor unit vibrates or oscillates about the shaft. These vibrations, unless limited or cushioned, may result in overstressing of the spring resulting in spring failure and possible breakage of the compressor components.

In accordance with the prior practices, limiting of the tilting or horizontal motion of the spring 12 has been accomplished by means of a rigid cup surrounding the exterior of the spring 12 or a rigid pin extending along the axis of the spring 12 or both. However, the use of such rigid members has been found to result in objectionable banging noises or in spring or compressor component failures due to the sharp impacts resulting from the contact with such rigid vibration limiting means.

In accordance with the present invention, such horizontal deflections of the spring 12 are absorbed or cushioned by means including a snubbing spring 24 arranged concentrically of the load supporting spring 12, the primary function of the snubbing spring 24 being to cushion or absorb the deflections of the spring 12 during starting and stopping of the compressor. It has been found that by use of a spring for this purpose, the life of the load supporting spring 12 is substantially increased and knocking and banging noises are eliminated.

The snubbing spring 24 is connected at one end to either the base member or the load-engaging portion of the spring 12. In the illustrated embodiment of the invention, the snubber spring 24 is fixedly secured to the load-engaging end of the vibration mount and for this purpose there is provided a cup-shaped connecting member 25 having its base portion 26 disposed between the stud 19 and the flange 9 and rigidly secured in that position by the bolt 21. The exterior surface of the cup member 25 is provided with spiral grooves for receiving the end turns or coils of the spring 24. The lower or free end 27 of the spring 24 is arranged concentrically with an intermediate portion of the spring 12 and in spaced relationship with the spring 12 a distance such that during normal running of the compressor, there is little or no contact between the snubber spring and the adjacent portions of the load supporting spring 12. However, under high vibration conditions as for example during the starting or stopping of the compressor, the larger horizontal deflections of the load supporting spring 12 result in tilting of the spring 12 to the point where portions thereof come in contact with the free end coils 27 of the snubber spring. The individual coils of the snubber spring then come into play to absorb some of the vibrational energy thus limiting by cushioning the motion of the compressor relative to the case without a sharp impact noise such as results when a solid cup member is employed in place of the spring 27. Some of the energy absorbed during the snubbing operation of the spring 27 is transmitted through the load engaging member 19 thus causing the member and the compressor to oscillate between the limits established by the snubber spring.

In order to reduce the amount of energy transferred by the snubber spring back to the load supporting member and the compressor during oscillation of the vibration mount, the horizontal spring rate of the snubber spring 27 is preferably substantially greater than the horizontal spring rate of the load supporting spring 12. To accomplish this the snubber spring is preferably close coiled with initial tension during the manufacture thereof so that the coils thereof are in frictional engagement with one another to provide a frictional damping as the coils slide over each other during deflection of the snubber spring.

To protect the motor-compressor unit against extreme shocks resulting during handling or shipment thereof, the snubbing spring 24 may be used in combination with a rigid vibration limiting means. When such a rigid vibration limiting means is employed, the snubber spring 24 is preferably connected to either the base member or the load engaging member while the rigid means is connected to the other of these two members. In the illustrated embodiment of the invention, the snubber spring 24 is connected to the load engaging member and the rigid vibration limiting means comprises an extended end 29 of the stud 16 which is preferably tapered as indicated in FIG. 3 of the drawing. During normal starting and stopping of the compressor, this end 29 of the stud will engage the spring 12. Under extreme shocks, with the end 29 of the stud 16 overlapping the free end coils 27 of the spring 24, contact of the snubber spring 24 with the coils of the spring 12 after contact of that spring with the stud will prevent further substantial deflection of the vibration mount.

While the present invention has been described with reference to a particular embodiment thereof, it will be understood that the invention is not limited thereto and it is intended by the appended claims to cover all such modifications as come within the true spirit and scope of the invention.

What I claim as new and desire to secure by Letters Patent of the United States is:

1. A spring mount comprising a base member and a load engaging member, a load supporting compression coil spring for absorbing normal vertical vibrations and having the ends thereof rigidly connected to said members, a snubber coil spring disposed concentric with said compression spring, and means rigidly anchoring one end of said snubber spring to one of said members with the other end in spaced relation with a section of said compression spring intermediate the ends thereof whereby lateral movement of said load engaging member relative to said base member will effect contact of said other end of said snubber spring with said spring section and thereby resiliently limit lateral relative movement of said base and load supporting members.

2. A spring mount comprising a base member and a load engaging member, a vertically extending load supporting compression coil spring having the lower end thereof rigidly secured to said base member and the upper end rigidly secured to said load engaging member and designed to absorb normal vertical vibrations of said load engaging member relative to said base member, a snubber coil spring having adjacent coils in frictional engagement and disposed concentric with said compression spring, means rigidly anchoring one end of said snubber spring to one of said members with the other unsupported end in spaced relation with a section of said compression spring intermediate the ends thereof for snubbing lateral relative movement of said base and load supporting members by contact of said unsupported end of said snubber spring with said compression spring.

3. A spring mount for resiliently supporting a load relative to a base, said mount comprising a load engaging member and a base member, a vertically disposed compression spring for yieldably supporting said load, means rigidly anchoring the ends of said compression spring respectively to said load engaging member and to said base member, a snubber spring for cushioning horizontal vibrations of said load, means rigidly securing one end of said snubber spring to one of said anchoring means with the free end thereof concentric with and surrounding said compression spring in spaced relation with an intermediate portion of said compression spring whereby contact of said compression spring with said snubber spring yieldably limits horizontal movement of said load engaging member relative to said base member under normal operating conditions, and a rigid pin connected at one end to the other of said anchoring means and having its free end extending axially through said compression spring in overlapping relationship with the free end of said snubber spring for limiting horizontal movement of said load engaging member relative to said base member under abnormal vibration conditions by contact of said compression spring with said pin.

References Cited in the file of this patent

UNITED STATES PATENTS

| | | |
|---|---|---|
| 190,582 | Hansell | May 8, 1877 |
| 1,214,120 | Bayne | Jan. 30, 1917 |
| 1,556,717 | Robinson | Oct. 13, 1925 |
| 1,988,295 | Berry | Jan. 15, 1935 |
| 2,153,387 | Newman | Apr. 4, 1939 |
| 2,222,724 | Rogers | Nov. 26, 1940 |
| 2,287,203 | Smith | June 23, 1942 |